United States Patent [19]

Steudler, Jr.

[11] Patent Number: 5,289,797
[45] Date of Patent: Mar. 1, 1994

[54] INSULATED WATERING SYSTEM FOR FOWL AND/OR ANIMALS

[75] Inventor: Frederick W. Steudler, Jr., Providence, Pa.

[73] Assignee: Val Products Inc., Bird-in-Hand, Pa.

[21] Appl. No.: 78,095

[22] Filed: Jun. 18, 1993

[51] Int. Cl.⁵ .............................................. A01K 39/02
[52] U.S. Cl. ...................................................... 119/72
[58] Field of Search ................... 119/72, 72.5, 73, 74; 285/177

[56] References Cited

U.S. PATENT DOCUMENTS

| | | | |
|---|---|---|---|
| 3,513,811 | 5/1970 | Graham | 119/72.5 |
| 3,789,800 | 2/1974 | Steudler, Jr. | 119/72 X |
| 4,055,147 | 10/1977 | Fletcher et al. | 119/72 |
| 4,480,860 | 11/1984 | Foresta et al. | 285/177 |
| 4,543,912 | 10/1985 | Steudler, Jr. | 119/72 X |
| 4,629,218 | 12/1986 | Dubois | 285/176 |
| 4,712,812 | 12/1987 | Weir, III | 285/177 |
| 4,822,077 | 4/1989 | Hendrickson | 285/12 |
| 5,025,754 | 6/1991 | Plyler | 119/73 |
| 5,031,755 | 7/1991 | Blackeley | 285/112 |

Primary Examiner—Gene Mancene
Assistant Examiner—Thomas Price
Attorney, Agent, or Firm—Diller, Ramik & Wight

[57] ABSTRACT

An insulated watering system is provided for fowl, animals or the like in which a length of pipeline is defined by several groups of watering pipes with each group of watering pipes being of a different wall thickness and having greater heat-insulating efficiency in the direction of water flow. The pipes are preferably formed from foamed polymeric/copolymeric material, such as polyvinylchloride, and each includes an interior cylindrical closed cell core sandwiched between noncellular skins or plies. The exterior diameters of all watering pipes are identical, but the interior diameters of the various groups decrease in the direction of water flow. In this fashion, a larger wall thicknesses of the pipes effectively insulate the lesser volume of water flowing through the water line along downstream portions thereof.

29 Claims, 2 Drawing Sheets

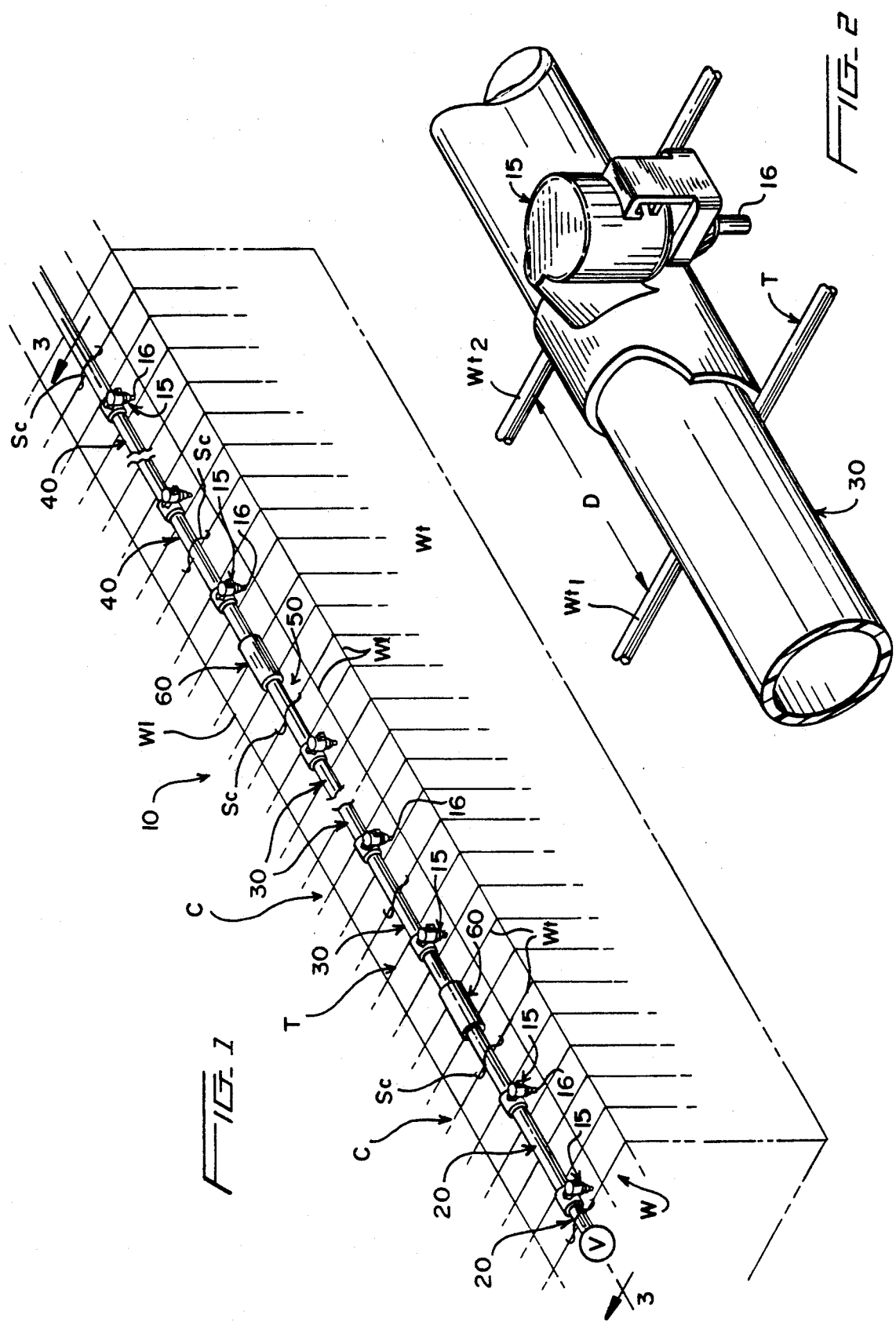

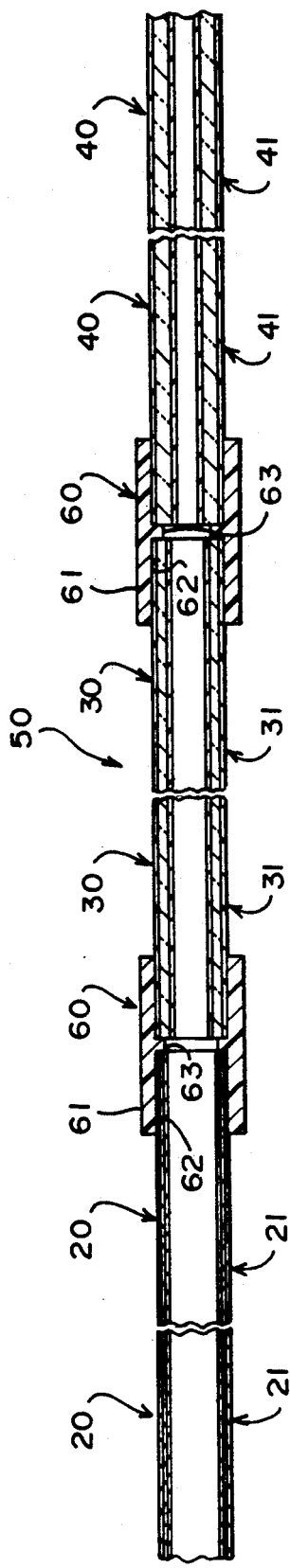
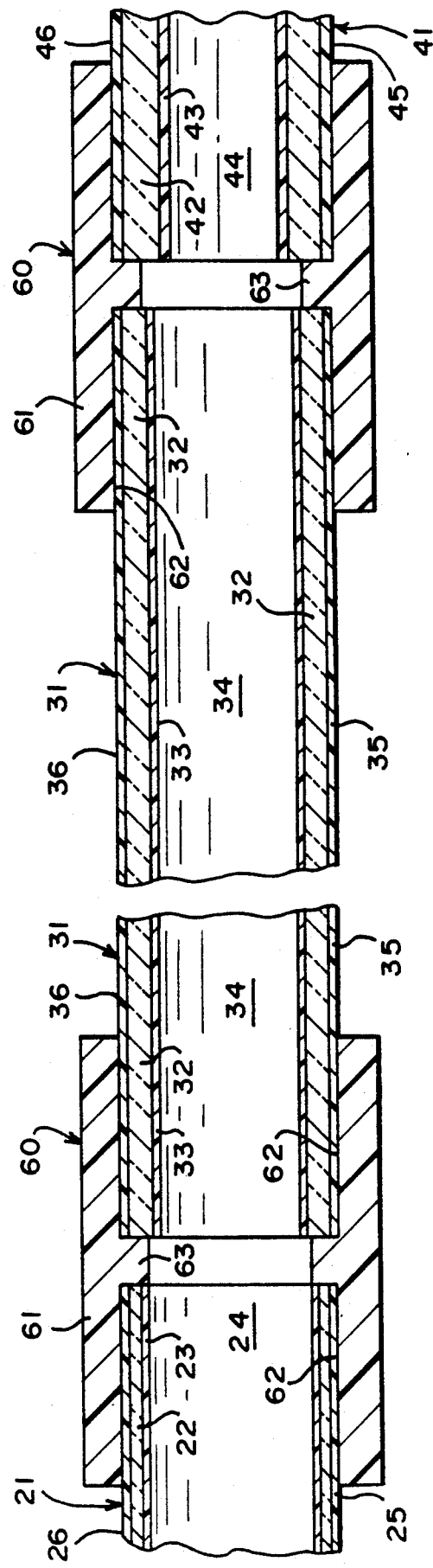

INSULATED WATERING SYSTEM FOR FOWL AND/OR ANIMALS

BACKGROUND OF THE INVENTION

The invention disclosed herein relates to an insulated watering system for fowl, poultry or similar animals.

In typical conventional watering systems, watering pipes of relatively short lengths, such as ten feet, are connected in-line to each other to form relatively long watering lines which can be 100 feet, 200 feet, or more in length. Such watering lines carry a plurality of drinkers/nipples, each having an actuating pin and an associated valve. One typical watering system of this type is disclosed in U.S. Pat. No. 4,884,512 issued on Dec. 5, 1989 to Frederick W. Steudler, Jr. which is entitled Water Pipe Bracket and Clip for Poultry, Small Animals and the like Watering System. The latter is a height-adjustable suspended watering system, but the water pipes can equally simply rest atop associated wire cages with the nipples and/or the drinking pins thereof projecting downwardly into the cages, as exemplified by U.S. Pat. No. 4,543,912 issued Oct. 1, 1985 in the name of Frederick W. Steudler, Jr. and entitled Water System for Foul.

The drinking nipples/nozzles associated with such watering systems and others are preferably constructed in accordance with the disclosures of U.S. Pat. Nos. 4,606,301; 4,610,221; 4,660,509 issued respectively on Aug. 19, 1986; Sep. 9, 1986; Apr. 28, 1989, and in U.S. patent application Ser. No. 07/866,639 filed Apr. 10, 1992 entitled Watering System for Fowl/Small Animals, all in the name of Frederick W. Steudler, Jr.

SUMMARY OF THE INVENTION

All of the latter systems and the associated drinking nipples have proved imminently successful from both the standpoint of operability and commercial success. However, a perplexing problem has been observed in Asian countries, which have a substantially higher bird mortality rate than bird mortality rates in the United States. While higher bird mortality rates in Asian countries could be attributed to many factors, the inventor ascribes the same to his recognition that water supplies in such normally hotter countries are, obviously, hotter than water supplies in the United States. For example, the water temperature might range between 85° F.–90° F. in Asian countries as opposed to water temperature of perhaps 55° F. in the United States. When the watering lines/drinking pipes are extremely long (400 feet, for example), the source water at 85° F.–90° F. increases in temperature as it travels through the long drinking lines when subjected to high outdoor ambient temperatures and, thus, becomes progressively warmer which is thus less effective at cooling the bird/fowl "from the inside" so to speak, then would occur upon the ingestion of relatively cooler water. Furthermore, hotter water is more conducive to generating bacteria or augmenting bacteria growth which in turn increases bird mortality.

Obviously, water in a watering line which is immediately adjacent the source is inherently cooler than water which has travelled the length of relatively long watering pipes. Therefore, the problem becomes one of maintaining a relatively low temperature differential between a drinker most adjacent the source and a drinker most remote therefrom, and this can be done by utilizing standard plastic or metal watering pipe and insulating the exterior in a conventional manner. For example, one might connect together twenty lengths of ten foot pipe of a nominal one inch diameter and insulate the exterior with a one-half inch of insulation, but the water exiting a drinker most remote from the water source would be much warmer than the water exiting a drinker most adjacent the water source because (a) the diameter of the pipe is unchanged and (b) the thickness of the insulation remains the same. Thus, there is a high temperature gradient/differential between the water exiting the drinkers most adjacent to and most remote from the water source. In other words, since the pipes are of a constant diameter along the entire length of the watering line and because the insulation is of a constant thickness along the watering line, the overall temperature differential between the upstream-most and downstream-most points of the watering pipe is relatively high, though obviously not as high as a noninsulated watering line. Obviously, this temperature differential between the upstream-most and downstream-most points of the watering line can be reduced by utilizing a greater thickness of insulation, but such involves added costs. Accordingly, the problem is that of decreasing the temperature differential increase between an upstream-most point and a downstream-most point of a relatively long watering system pipeline, and the inventor has solved this problem in the unobvious manner set forth immediately hereinafter.

SUMMARY OF THE INVENTION

In keeping with the present invention, a watering system for fowl, animals or the like is defined by a plurality of lengths of tubular watering pipe which are connected to each other by tubular connectors to define a relatively long watering line through which water is adapted to flow in a predetermined direction from a source toward a remote end thereof. A plurality of nipple drinkers are disposed along the watering line for delivering water therefrom to fowl, animals or the like. The tubular watering pipes are of generally the same exterior diameter, but are of at least two different interior diameters, and are preferably of three or more different interior diameters to thereby define at least a first group of watering pipes of a first relatively small wall thickness and a second group of watering pipes of a second relatively large wall thickness. The second group of watering pipes are disposed downstream relative to the first group of watering pipes in the predetermined direction of water flow. In this manner, the relatively large wall thickness and the smaller internal diameter second group of water pipes is more remote from the water source than the larger internal diameter smaller wall thickness first group of watering pipes most adjacent the water source. Thus, a greater volume of water flows through the first group of watering pipes, while a lesser volume of water flows through the second group of watering pipes. Moreover, all of the tubular watering pipes are formed of synthetic polymeric/copolymeric closed cell foamed plastic material, such as polyvinylchloride (PVC) defined by generally impervious solid skin-like interior and exterior surfaces and a closed foam cell core therebetween. Such foamed closed cell synthetic polymeric/copolymeric material has excellent insulation qualities which assures a relatively high degree of insulation along the entire length of the water line, particularly as the wall thickness of the water pipes increases in the direction of flow. The latter not only reduces the temperature differential (increase) between an upstream-most point adjacent the water source and a downstream-most point remote therefrom, but also allows all of the watering pipes to be connected by the same tubular connectors/couplings irrespective of the internal diameter differences of the watering pipes.

The insulated watering system is also relatively inexpensive to manufacture and install, particularly because separate insulation need not be applied thereto and because one single size of connectors can be utilized for connecting together all of the watering pipes irrespective of variations in the wall thicknesses and internal diameters thereof, because, of course, all of the watering pipes are of generally the same exterior diameter corresponding to the interior diameter of the tubular connectors.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 1 is a perspective view of a novel insulated watering system of the present invention, and illustrates a plurality of nipples/drinkers carried by each of a plurality of insulated pipes joined together by identical couplers to define a watering line of considerable length resting atop wires of a wire cage within which can be housed birds, fowl or like animals.

FIG. 2 is an enlarged fragmentary elevational view, partially in cross-section of one of the watering pipes and nipples/drinkers of FIG. 1, and illustrates the manner in which the watering pipe rests atop wires of the cage with a pin of the nipple/drinker projecting downwardly for access by an associated bird or animal.

FIG. 3 is an enlarged fragmentary cross-sectional view taken generally along line 3—3 of FIG. 1, and illustrates the watering line, connectors associated therewith, and a plurality of groups of watering tubes, each of the same exterior diameter, different interior diameters, and different wall thicknesses.

FIG. 4 is also an enlarged cross-sectional view taken generally along line 3—3 of FIG. 1, and illustrates details of the connectors and tubular watering pipes of FIGS. 1 and 3.

DESCRIPTION OF THE PREFERRED EMBODIMENTS

A novel insulated watering system for fowl, poultry, animals or the like constructed in accordance with this invention is fully illustrated in FIG. 1 of the drawings, and is generally designated by the reference numeral 10. The insulated watering system 10 is associated with a plurality of side-by-side wire cages which are singularly and collectively designated by the reference character C. Each cage C is formed of a plurality of wires W which set-off opposite parallel end walls (unnumbered), opposite parallel side walls (unnumbered) which are normal to the end walls, a bottom wall (not shown) and a top wall T. The top wall T is defined or set-off by a plurality of longitudinal extending generally parallel wires Wl and intersecting transverse wires Wt, with adjacent pairs of the latter being spaced a predetermined distance D from each other, as is specifically illustrated in FIG. 2 with the distance between two spaced transverse wires Wt1 and Wt2 being designated by the reference character D. The distance D is, of course, the same between all adjacent transverse wires Wt.

Resting atop the top T of the cage(s) C are a plurality of tubular water pipes 20, 30, 40 collectively defining a water line 50. Each individual tubular water pipe 20, 30, 40 is approximately ten feet long, and adjacent tubular water pipes 20, 30, 40 are connected together by a connector or coupling means 60. The couplings 60 correspond identically to the couplings 10 disclosed in U.S. Pat. No. 4,543,910 and the totality of the description thereof is herein incorporated by reference. However, it is to be specifically noted that each connector 60 is formed of polymeric/copolymeric synthetic plastic material and includes an exterior cylindrical surface 61, an interior cylindrical surface 62, and a radially inwardly directed flange 63 which functions as an abutment for the various tubular watering pipes 20, 30, 40, as is readily apparent in FIGS. 3 and 4 of the drawings. The radially inward projection of the flange 63 of each connector 61 is less than the inside diameter of any of the tubular watering pipes 20, 30, 40, which is best illustrated in FIG. 3 of the drawings.

A plurality of suitable clips, such as spring clips Sc having looped ends (unnumbered) are utilized to hold the pipes 20, 30, 40 atop the top T of the various cages C, again in the manner further illustrated and described in U.S. Pat. No. 4,543,912.

A valve V (FIG. 1) can be opened/closed/adjusted to deliver an appropriate flow of water from the source not shown) which would be generally located to the left in FIG. 1 from an upstream end portion through the upstream-most pipes 20 and continuing through the pipes 30 toward and through the last of the downstream-most pipes 40 and through a series of identical nipples/drinkers 15 located along the length of the tubular pipes 20, 30, 40 of the watering line 60. Each nipple or drinker 15 corresponds in structure and operation to the nipple/drinker 20 disclosed in U.S. patent application Ser. No. 07/866,639, and the totality of the description thereof is herein incorporated by reference. However, it need but be noted that water will pass from the watering line 50 through any of the drinkers 15 due to movement imparted to a pin 16 by a bird or an animal which in turn unseats a ball valve or ball (not shown) within each drinker 15 causing water to flow into the beak/mouth of an associated bird/animal.

Reference is specifically made to FIGS. 3 and 4 of the drawings in which the tubular watering pipes 20, 30, 40 are illustrated as included respective cylindrical walls 21, 31, 41.

The walls 21 are each defined by an inner core 22, and inner ply 23 having an interior surface 24 and an outer ply 25 having an exterior surface 26.

Similarly, each of the tubular pipes 30 is defined by an inner core 32, an inner ply 33 having an interior cylindrical surface 34 and an exterior ply 35 having an exterior cylindrical surface 36.

Each of the tubular pipes 40 includes an inner core 42, an interior ply 43 having an interior cylindrical surface 44 and an exterior ply 45 having an exterior cylindrical surface 46. Each of the watering pipes 20, 30, 40 is formed from polymeric/copolymeric plastic material, such as polyvinylchloride (PVC) which is blown in a conventional manner to form closed cells entrapping air/gas or an admixture thereof as the center cores 22, 32, 42 having exceptionally high insulation properties, whereas the plies 23, 25, 33, 35, 43, 45 are impervious solid skins or membranes. The skins or membranes 23, 25, 33, 35, 43, 45 are each generally of an identical thickness, namely, normally 0.030 inch. However, the closed cell cores 22, 32, 43 of the respective watering pipes 20, 30, 40 vary in thickness with the core 22 being the thinnest, the core 32 being of an intermediate thickness, and the core 42 being the thickest of the cores 22, 32, 43. The exterior diameters of the exterior surfaces 26, 36, 46 of the respective pipes 20, 30, 40 is the same, namely, nominally 1.050 inch which corresponds generally to the interior diameter of the interior cylindrical surface 62 of each connector 60 which allows one size connector 60 to be bonded/fused to any of the pipes 20, 30, 40. The interior cylindrical surface 24, 34, 44 of the respective pipes 20, 30, 40 have respective nominal diameter of 0.750 inch, 0.640 inch and 0.480 inch. Due to the latter construction, all of the watering pipes 20 of the totality of the group of watering pipes 20 adjacent the valve V and thus most adjacent the water source (not shown) are the least insulated because of the lesser wall thickness and particularly the lesser thickness of the closed cell core 22 as, for example, compared to the next greater wall thickness and closed cell core thickness of the watering pipes 30 followed by the final group of tubular watering pipes 40 having the maximum wall thickness and the maximum thickness of the closed cell core 42. Thus, minimum insulation is most adjacent the source of the water, whereas maximum insulation is remote therefrom. Furthermore, the diameter of the group of water pipes 20 is maximum at the water source, lessens through the group of water pipes 30 and is least at downstream-most points defined by the pipes 40. Hence, the volume of water is greatest flowing through the watering pipes 20 and least flowing through the water pipes 40, although the speed is inverse thereto. Due to this construction, as the water travels along the length of the watering pipe 50 from the source, as it is being depleted through the various drinkers 15 therealong, the water is progressively subject to progressively greater insulation in the direction of water flow which, of course, offsets the time the water is subject to ambient external temperatures to thereby effectively decrease/lessen the thermal differential between the temperature of the water at the source and at a point most remote therefrom. Obviously, the water most adjacent the source is coolest and because its volume is greatest, due to the large diameter of the watering pipes 20, the water temperature will be least effected by ambient temperature, particularly because much of the water is being depleted by the fowl/birds as it travels through the first group of watering pipes 20. Thus, for perhaps 100 feet of the plurality of watering pipes 20 the minimum insulation afforded the cores 22 thereof is quite adequate to prevent detrimental water temperature increase. As the water proceeds further through the next group of watering pipes 30, assuming for another 100 feet, the increased insulation because of the thicker cores 32 affords additional protection and likewise precludes excessive water temperature increase as, of course, the water volume reduces as the diameter decreases and, of course, more water is dispensed through the nipples 15 along the watering pipes 30. Obviously, as the remaining water enters and flows through the last group of watering pipes 40, assumed to be of another 100 foot length, maximum insulation is effected by the greatest wall thickness of the cores 42 of the watering pipes 40. Thus, in this fashion the relatively large wall thickness and the increase thereof away from the source in the direction of water flow insulates the lesser volume of water flowing through the water line along downstream portions thereof assuring minimum water temperature increase anywhere along the watering line 50 due to ambient temperature thereby decreasing the earlier mentioned disadvantages of increased bacteria and high poultry/bird mortality.

Although a preferred embodiment of the invention has been specifically illustrated and described herein, it is to be understood that minor variations may be made in the apparatus without departing from the spirit and scope of the invention, as defined the appended claims.

I claim:

1. A watering system for fowl, animals or the like comprising a plurality of lengths of tubular watering pipes, means for connecting said watering pipes to form a relatively long watering line through which water is adapted to flow in a predetermined direction, a plurality of drinker means along said watering line for delivering water from said watering line to fowl, animals or the like, said tubular watering pipes being of generally the same exterior diameter, said tubular watering pipes being of at least two different interior diameters to thereby define a first group of watering pipes of a first relatively small wall thickness and a second group of watering pipes of a second relatively large wall thickness, and said second group of watering pipes being disposed downstream relative to said first group of watering pipes in the predetermined direction of water flow whereby the relatively large wall thickness effectively insulates the lesser volume of water flowing through the water lines along downstream portions thereof.

2. The watering system as defined in claim 1 wherein said tubular watering pipes are each formed of synthetic polymeric/copolymeric plastic material.

3. The watering system as defined in claim 2 wherein said connecting means are tubular connectors each having an internal diameter corresponding substantially to said watering pipes exterior diameters whereby the same tubular connectors can be used to connect together (a) the first group of watering pipes to each other, (b) the second group of watering pipes to each other, and (c) any selected first group watering pipe to any selected second group watering pipe.

4. The watering system as defined in claim 2 wherein said watering line includes a further plurality of lengths of tubular watering pipes of generally said same exterior diameter and an interior diameter defining an intermediate wall thickness greater than said small wall thickness and less than said large wall thickness, a plurality of further drinker means along said third group of watering pipes for delivering water to fowl, animals or the like, and said third group of watering pipes being disposed between said first and second group of watering pipes.

5. The watering system as defined in claim 1 wherein said tubular watering pipes are each formed of synthetic polymeric/copolymeric closed cell plastic material.

6. The watering system as defined in claim 5 wherein said connecting means are tubular connectors each having an internal diameter corresponding substantially to said watering pipes exterior diameters whereby the same tubular connectors can be used to connect together (a) the first group of watering pipes to each other, (b) the second group of watering pipes to each other, and (c) any selected first group watering pipe to any selected second group watering pipe.

7. The watering system as defined in claim 5 wherein said watering line includes a further plurality of lengths of tubular watering pipes of generally said same exterior diameter and an interior diameter defining an intermediate wall thickness greater than said small wall thickness and less than said large wall thickness, a plurality of further drinker means along said third group of watering pipes for delivering water to fowl, animals or the like, and said third group of watering pipes being disposed between said first and second group of watering pipes.

8. The watering system as defined in claim 1 wherein said tubular watering pipes are each formed of synthetic polymeric/copolymeric closed cell foamed plastic material.

9. The watering system as defined in claim 8 wherein said connecting means are tubular connectors each having an internal diameter corresponding substantially to said watering pipes exterior diameters whereby the same tubular connectors can be used to connect together (a) the first group of watering pipes to each other, (b) the second group of watering pipes to each other, and (c) any selected first group watering pipe to any selected second group watering pipe.

10. The watering system as defined in claim 8 wherein said watering line includes a further plurality of lengths of tubular watering pipes of generally said same exterior diameter and an interior diameter defining an intermediate wall thickness greater than said small wall thickness and less than said large wall thickness, a plurality of further drinker means along said third group of watering pipes for delivering water to fowl, animals or the like, and said third group of watering pipes being disposed between said first and second group of watering pipes.

11. The watering system as defined in claim 1 wherein said tubular watering pipes are each formed of synthetic polymeric/copolymeric plastic material, and said tubular water pipes have internal and external generally impervious solid skin-like surfaces.

12. The watering system as defined in claim 11 wherein said connecting means are tubular connectors each having an internal diameter corresponding substantially to said watering pipes exterior diameters whereby the same tubular connectors can be used to connect together (a) the first group of watering pipes to each other, (b) the second group of watering pipes to each other, and (c) any selected first group watering pipe to any selected second group watering pipe.

13. The watering system as defined in claim 11 wherein said watering line includes a further plurality of lengths of tubular watering pipes of generally said same exterior diameter and an interior diameter defining an intermediate wall thickness greater than said small wall thickness and less than said large wall thickness, a plurality of further drinker means along said third group of watering pipes for delivering water to fowl, animals or the like, and said third group of watering pipes being disposed between said first and second group of watering pipes.

14. The watering system as defined in claim 1 wherein said tubular watering pipes are each formed of synthetic polymeric/copolymeric closed cell plastic material, and said tubular water pipes have internal and external generally impervious solid skin-like surfaces.

15. The watering system as defined in claim 14 wherein said connecting means are tubular connectors each having an internal diameter corresponding substantially to said watering pipes exterior diameters whereby the same tubular connectors can be used to connect together (a) the first group of watering pipes to each other, (b) the second group of watering pipes to each other, and (c) any selected first group watering pipe to any selected second group watering pipe.

16. The watering system as defined in claim 14 wherein said watering line includes a further plurality of lengths of tubular watering pipes of generally said same exterior diameter and an interior diameter defining an intermediate wall thickness greater than said small wall thickness and less than said large wall thickness, a plurality of further drinker means along said third group of watering pipes for delivering water to fowl, animals or the like, and said third group of watering pipes being disposed between said first and second group of watering pipes.

17. The watering system as defined in claim 1 wherein said tubular watering pipes are each formed of synthetic polymeric/copolymeric closed cell foamed plastic material, and said tubular water pipes have internal and external generally impervious solid skin-like surfaces.

18. The watering system as defined in claim 17 wherein said connecting means are tubular connectors each having an internal diameter corresponding substantially to said watering pipes exterior diameters whereby the same tubular connectors can be used to connect together (a) the first group of watering pipes to each other, (b) the second group of watering pipes to each other, and (c) any selected first group watering pipe to any selected second group watering pipe.

19. The watering system as defined in claim 17 wherein said watering line includes a further plurality of lengths of tubular watering pipes of generally said same exterior diameter and an interior diameter defining an intermediate wall thickness greater than said small wall thickness and less than said large wall thickness, a plurality of further drinker means along said third group of watering pipes for delivering water to fowl, animals or the like, and said third group of watering pipes being disposed between said first and second group of watering pipes.

20. The watering system as defined in claim 1 wherein said connecting means are tubular connectors each having an internal diameter corresponding substantially to said watering pipes exterior diameters whereby the same tubular connectors can be used to connect together (a) the first group of watering pipes to each other, (b) the second group of watering pipes to each other, and (c) any selected first group watering pipe to any selected second group watering pipe.

21. The watering system as defined in claim 20 wherein said watering line includes a further plurality of lengths of tubular watering pipes of generally said same exterior diameter and an interior diameter defining an intermediate wall thickness greater than said small wall thickness and less than said large wall thickness, a plurality of further drinker means along said third group of watering pipes for delivering water to fowl, animals or the like, and said third group of watering pipes being disposed between said first and second group of watering pipes.

22. The watering system as defined in claim 20 wherein said connecting means are tubular connectors each having an internal diameter corresponding to said watering pipes exterior diameter whereby any tubular watering pipe of any group of watering pipes can be connected together.

23. The watering system as defined in claim 22 wherein said tubular watering pipes are each formed of synthetic polymeric/copolymeric plastic material.

24. The watering system as defined in claim 22 wherein said tubular watering pipes are each formed of synthetic polymeric/copolymeric closed cell plastic material.

25. The watering system as defined in claim 22 wherein said tubular watering pipes are each formed of synthetic polymeric/copolymeric closed cell foamed plastic material.

26. The watering system as defined in claim 22 wherein said tubular watering pipes are each formed of synthetic polymeric/copolymeric plastic material, and said tubular water pipes have internal and external generally impervious solid skin-like surfaces.

27. The watering system as defined in claim 22 wherein said tubular watering pipes are each formed of synthetic polymeric/copolymeric closed cell plastic material, and said tubular water pipes have internal and external generally impervious solid skin-like surfaces.

28. The watering system as defined in claim 22 wherein said tubular watering pipes are each formed of synthetic polymeric/copolymeric closed cell foamed plastic material, and said tubular water pipes have internal and external generally impervious solid skin-like surfaces.

29. The watering system as defined in claim 1 wherein said watering line includes a further plurality of lengths of tubular watering pipes of generally said same exterior diameter and an interior diameter defining an intermediate wall thickness greater than said small wall thickness and less than said large wall thickness, a plurality of further drinker means along said third group of watering pipes for delivering water to fowl, animals or the like, and said third group of watering pipes being disposed between said first and second group of watering pipes.

* * * * *